United States Patent
Devine et al.

(10) Patent No.: US 7,447,736 B2
(45) Date of Patent: *Nov. 4, 2008

(54) CUSTOMER INTERFACE SYSTEM FOR MANAGING COMMUNICATIONS SERVICES INCLUDING TOLL FREE SERVICES

(75) Inventors: Carol Y. Devine, Colorado Springs, CO (US); Richard W. Shoulberg, Maniton Springs, CO (US); Gerald A. Shifrin, Monument, CO (US); Robert A. Pfister, Colorado Springs, CO (US); Douglas B. Fenley, Colorado Springs, CO (US); Charles A. Suscheck, Colorado Springs, CO (US); P. Alex Delano, Colorado Springs, CO (US); W. Russell Kennington, Plano, TX (US); Andre R. Brandt, Colorado Springs, CO (US); Sajan J. Pillai, Colorado Springs, CO (US); Edward Schwarz, New York, NY (US); Arieh Shamash, Great Neck, NY (US)

(73) Assignees: MCI Communications Corporation, Ashburn, VA (US); Verizion Business Global LLC, Ashburn, VA (US)

( * ) Notice: Subject to any disclaimer, the term of this patent is extended or adjusted under 35 U.S.C. 154(b) by 649 days.

This patent is subject to a terminal disclaimer.

(21) Appl. No.: 10/835,326

(22) Filed: Apr. 30, 2004

(65) Prior Publication Data

US 2005/0172018 A1    Aug. 4, 2005

Related U.S. Application Data

(63) Continuation of application No. 09/160,725, filed on Sep. 25, 1998, now Pat. No. 6,763,376.

(51) Int. Cl.
*G06F 13/00* (2006.01)
(52) U.S. Cl. .................................... 709/203
(58) Field of Classification Search ................ 709/203
See application file for complete search history.

(56) References Cited

U.S. PATENT DOCUMENTS

| 4,160,129 A | 7/1979 | Peyser et al. |
| 4,345,315 A | 8/1982 | Cadotte et al. |
| 4,817,050 A | 3/1989 | Komatsu et al. |

(Continued)

FOREIGN PATENT DOCUMENTS

EP    0 747 841    12/1996

(Continued)

OTHER PUBLICATIONS

Strom, D., "Control Everything", Network World, Aug. 20, 2001, 18, 34; pp. 39-41.

(Continued)

*Primary Examiner*—Robert B Harrell

(57) ABSTRACT

A network management system allows a customer of a communications service provider to manage communications services using a web server that communicates with a client web browser. The customer is able to view information associated with various communications systems and services via the client web browser. The customer is also able to submit requests for changes in service to the web server.

20 Claims, 4 Drawing Sheets

U.S. PATENT DOCUMENTS

| | | | |
|---|---|---|---|
| 4,823,373 A | 4/1989 | Takahashi et al. | |
| 4,893,248 A | 1/1990 | Pitts et al. | |
| 4,972,504 A | 11/1990 | Daniel, Jr. et al. | |
| 5,041,972 A | 8/1991 | Frost | |
| 5,075,771 A | 12/1991 | Hashimoto | |
| 5,088,052 A | 2/1992 | Spielman et al. | |
| 5,131,020 A | 7/1992 | Liebesny et al. | |
| 5,136,707 A | 8/1992 | Block et al. | |
| 5,208,908 A | 5/1993 | Harrison et al. | |
| 5,223,699 A | 6/1993 | Flynn et al. | |
| 5,228,076 A | 7/1993 | Hopner et al. | |
| 5,245,533 A | 9/1993 | Marshall | |
| 5,262,760 A | 11/1993 | Iwamura et al. | |
| 5,285,494 A | 2/1994 | Sprecher et al. | |
| 5,287,270 A | 2/1994 | Hardy et al. | |
| 5,313,598 A | 5/1994 | Yamakawa | |
| 5,315,093 A | 5/1994 | Stewart | |
| 5,325,290 A | 6/1994 | Cauffman et al. | |
| 5,327,486 A | 7/1994 | Wolff et al. | |
| 5,361,259 A | 11/1994 | Hunt et al. | |
| 5,369,571 A | 11/1994 | Metts | |
| 5,452,446 A | 9/1995 | Johnson | |
| 5,475,836 A | 12/1995 | Harris et al. | |
| 5,481,542 A | 1/1996 | Logston et al. | |
| 5,483,596 A | 1/1996 | Rosenow et al. | |
| 5,490,060 A | 2/1996 | Malec et al. | |
| 5,491,779 A | 2/1996 | Bezjian | |
| 5,491,796 A | 2/1996 | Wanderer et al. | |
| 5,506,893 A | 4/1996 | Buscher et al. | |
| 5,526,257 A | 6/1996 | Lerner | |
| 5,530,744 A | 6/1996 | Charalambous et al. | |
| 5,533,108 A | 7/1996 | Harris et al. | |
| 5,537,611 A | 7/1996 | Rajagopal et al. | |
| 5,539,734 A | 7/1996 | Burwell et al. | |
| 5,548,726 A | 8/1996 | Pettus | |
| 5,551,025 A | 8/1996 | O'Reilly et al. | |
| 5,555,290 A | 9/1996 | McLeod et al. | |
| 5,557,668 A | 9/1996 | Brady | |
| 5,563,805 A | 10/1996 | Arbuckle et al. | |
| 5,566,351 A | 10/1996 | Crittenden et al. | |
| 5,586,260 A | 12/1996 | Hu | |
| 5,602,918 A | 2/1997 | Chen et al. | |
| 5,610,915 A | 3/1997 | Elliott et al. | |
| 5,621,727 A | 4/1997 | Vaudreuil | |
| 5,623,601 A | 4/1997 | Vu | |
| 5,630,066 A | 5/1997 | Gosling | |
| 5,649,182 A | 7/1997 | Reitz | |
| 5,650,994 A | 7/1997 | Daley | |
| 5,659,601 A | 8/1997 | Cheslog | |
| 5,666,481 A | 9/1997 | Lewis | |
| 5,671,354 A | 9/1997 | Ito et al. | |
| 5,689,645 A | 11/1997 | Schettler et al. | |
| 5,692,030 A | 11/1997 | Teglovic et al. | |
| 5,692,181 A | 11/1997 | Anand et al. | |
| 5,694,546 A | 12/1997 | Reisman | |
| 5,696,906 A | 12/1997 | Peters et al. | |
| 5,699,403 A | 12/1997 | Ronnen | |
| 5,699,528 A | 12/1997 | Hogan | |
| 5,706,502 A | 1/1998 | Foley et al. | |
| 5,708,780 A | 1/1998 | Levergood et al. | |
| 5,710,882 A | 1/1998 | Svennevik et al. | |
| 5,721,908 A | 2/1998 | Lagarde et al. | |
| 5,721,913 A | 2/1998 | Ackroff et al. | |
| 5,727,129 A | 3/1998 | Barrett et al. | |
| 5,734,709 A | 3/1998 | DeWitt et al. | |
| 5,734,831 A | 3/1998 | Sanders | |
| 5,742,762 A | 4/1998 | Scholl et al. | |
| 5,742,763 A | 4/1998 | Jones | |
| 5,742,768 A | 4/1998 | Gennaro et al. | |
| 5,742,905 A | 4/1998 | Pepe et al. | |
| 5,745,754 A | 4/1998 | Lagarde et al. | |
| 5,754,830 A | 5/1998 | Butts et al. | |
| 5,757,900 A | 5/1998 | Nagel et al. | |
| 5,764,756 A | 6/1998 | Onweller | |
| 5,768,501 A | 6/1998 | Lewis | |
| 5,774,660 A | 6/1998 | Brendel et al. | |
| 5,774,670 A | 6/1998 | Montulli | |
| 5,778,178 A | 7/1998 | Arunachalam | |
| 5,778,377 A | 7/1998 | Marlin et al. | |
| 5,781,550 A | 7/1998 | Templin et al. | |
| 5,781,632 A | 7/1998 | Odom | |
| 5,787,160 A | 7/1998 | Chaney et al. | |
| 5,787,412 A | 7/1998 | Bosch et al. | |
| 5,790,780 A | 8/1998 | Brichta et al. | |
| 5,790,789 A | 8/1998 | Suarez | |
| 5,790,797 A | 8/1998 | Shimada et al. | |
| 5,790,809 A | 8/1998 | Holmes | |
| 5,793,762 A | 8/1998 | Penners et al. | |
| 5,793,964 A | 8/1998 | Rogers et al. | |
| 5,796,393 A | 8/1998 | MacNaughton et al. | |
| 5,799,154 A | 8/1998 | Kuriyan | |
| 5,802,320 A | 9/1998 | Baehr et al. | |
| 5,805,803 A | 9/1998 | Birrell et al. | |
| 5,812,533 A | 9/1998 | Cox et al. | |
| 5,812,654 A | 9/1998 | Anderson et al. | |
| 5,812,750 A | 9/1998 | Dev et al. | |
| 5,815,080 A | 9/1998 | Taguchi | |
| 5,815,665 A | 9/1998 | Teper et al. | |
| 5,819,225 A | 10/1998 | Eastwood et al. | |
| 5,819,271 A | 10/1998 | Mahoney et al. | |
| 5,825,769 A | 10/1998 | O'Reilly et al. | |
| 5,825,890 A | 10/1998 | Elgamal et al. | |
| 5,826,029 A | 10/1998 | Gore, Jr. et al. | |
| 5,826,269 A | 10/1998 | Hussey | |
| 5,832,519 A | 11/1998 | Bowen et al. | |
| 5,835,084 A | 11/1998 | Bailey et al. | |
| 5,844,896 A | 12/1998 | Marks et al. | |
| 5,845,067 A | 12/1998 | Porter et al. | |
| 5,845,267 A | 12/1998 | Ronen | |
| 5,848,233 A | 12/1998 | Radia et al. | |
| 5,848,396 A | 12/1998 | Gerace | |
| 5,848,399 A | 12/1998 | Burke | |
| 5,850,517 A | 12/1998 | Verkler et al. | |
| 5,852,810 A | 12/1998 | Sotiroff et al. | |
| 5,852,812 A | 12/1998 | Reeder | |
| 5,862,325 A | 1/1999 | Reed et al. | |
| 5,867,495 A | 2/1999 | Elliott et al. | |
| 5,870,558 A | 2/1999 | Branton, Jr. et al. | |
| 5,875,236 A | 2/1999 | Jankowitz et al. | |
| 5,875,296 A | 2/1999 | Shi et al. | |
| 5,877,759 A | 3/1999 | Bauer | |
| 5,881,237 A | 3/1999 | Schwaller et al. | |
| 5,883,948 A | 3/1999 | Dunn | |
| 5,884,032 A | 3/1999 | Bateman et al. | |
| 5,884,312 A | 3/1999 | Dustan et al. | |
| 5,892,900 A | 4/1999 | Ginter et al. | |
| 5,905,719 A | 5/1999 | Arnold et al. | |
| 5,907,681 A | 5/1999 | Bates et al. | |
| 5,909,679 A | 6/1999 | Hall | |
| 5,909,682 A | 6/1999 | Cowan et al. | |
| 5,915,001 A | 6/1999 | Uppaluru | |
| 5,920,542 A | 7/1999 | Henderson | |
| 5,923,016 A | 7/1999 | Fredregill et al. | |
| 5,923,756 A | 7/1999 | Shambroom | |
| 5,930,764 A | 7/1999 | Melchione et al. | |
| 5,930,804 A | 7/1999 | Yu et al. | |
| 5,933,142 A | 8/1999 | LaStrange et al. | |
| 5,937,165 A | 8/1999 | Schwaller et al. | |
| 5,938,729 A | 8/1999 | Cote et al. | |
| 5,949,976 A | 9/1999 | Chappelle | |
| 5,953,389 A | 9/1999 | Pruett et al. | |
| 5,956,714 A | 9/1999 | Condon | |
| 5,958,016 A | 9/1999 | Chang et al. | |
| 5,960,411 A | 9/1999 | Hartman et al. | |

| | | |
|---|---|---|
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |
| 5,987,134 A | 11/1999 | Shin et al. |
| 5,987,523 A | 11/1999 | Hind et al. |
| 5,991,733 A | 11/1999 | Aleia et al. |
| 5,991,746 A | 11/1999 | Wang |
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A | 3/2000 | Neely |
| 6,049,602 A | 4/2000 | Foladare et al. |
| 6,049,786 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,065,116 A | 5/2000 | Isaacson et al. |
| 6,072,493 A | 6/2000 | Driskell et al. |
| 6,073,105 A | 6/2000 | Sutoliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,104,716 A | 8/2000 | Crichton et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,118,780 A | 9/2000 | Dunn et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A | 10/2000 | Voit et al. |
| 6,144,727 A | 11/2000 | Mashinsky |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. .................. 709/203 |
| 6,161,128 A | 12/2000 | Smyk |
| 6,163,597 A | 12/2000 | Voit |
| 6,173,311 B1 | 1/2001 | Hassett et al. |
| 6,182,113 B1 | 1/2001 | Narayanaswami |
| 6,205,456 B1 | 3/2001 | Nakao |
| 6,212,506 B1 | 4/2001 | Shah et al. |
| 6,212,546 B1 | 4/2001 | Starkovich et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,275,490 B1 | 8/2001 | Mattaway et al. |
| 6,282,281 B1 | 8/2001 | Low |
| 6,286,050 B1 | 9/2001 | Pullen et al. |
| 6,292,481 B1 | 9/2001 | Voit et al. |
| 6,295,551 B1 | 9/2001 | Roberts et al. |
| 6,337,858 B1 | 1/2002 | Petty et al. |
| 6,377,993 B1 | 4/2002 | Brandt et al. |
| 6,587,836 B1 | 7/2003 | Ahlberg et al. |
| 6,587,867 B1 * | 7/2003 | Miller et al. ................. 709/200 |
| 6,597,685 B2 | 7/2003 | Miloslavsky et al. |
| 6,598,167 B2 | 7/2003 | Devine et al. |
| 6,606,708 B1 | 8/2003 | Devine et al. |
| 6,615,258 B1 | 9/2003 | Barry et al. |
| 6,631,402 B1 | 10/2003 | Devine et al. |
| 6,683,870 B1 | 1/2004 | Archer |
| 6,715,080 B1 | 3/2004 | Starkovich et al. |
| 6,760,844 B1 | 7/2004 | McCarthy et al. |
| 6,763,376 B1 | 7/2004 | Devine et al. |
| 6,782,425 B1 | 8/2004 | Germscheid et al. |
| 6,968,571 B2 | 11/2005 | Devine et al. |
| 7,114,083 B2 | 9/2006 | Devine et al. |
| 2001/0001014 A1 | 5/2001 | Akins, III et al. |
| 2001/0003828 A1 | 6/2001 | Peterson et al. |
| 2004/0139178 A1 | 7/2004 | Mendez et al. |

FOREIGN PATENT DOCUMENTS

| | | |
|---|---|---|
| EP | 0 809 387 | 5/1997 |
| JP | 09-064870 A | 3/1997 |
| WO | 97/11443 | 3/1997 |
| WO | 97/16911 | 5/1997 |
| WO | 97/18515 | 5/1997 |
| WO | 97/23988 | 7/1997 |
| WO | 98/19472 | 5/1998 |
| WO | 99/01826 | 1/1999 |
| WO | WO 00/11573 | 3/2000 |

OTHER PUBLICATIONS

Biggs, M., *Inforworld*, Jun. 16, 1997, v. 19, No. 24, p. 82+.
Burch, B., "AT&T, MCI to release new management tools", *Network World*, Jan. 17, 1994, p. 19.
Chapman, D. Brent et al., "Building Internet Firewalls", Nov. 1995, O'Reilly & Associates, p. 58[3].
Low, C., "Integrating Communication Services", *IEEE Communications Magazine*, Jun. 1997, p. 164169.
Meteorology; [9] Databases, "Inforonics offers controlled access to Web Meteorology", Information Today, Apr. 1997, vol. 14 Issue 4, p. 53, 2p. This article reports that Inforonics has developed a controlled access gateway to MGA (Meteorological and Geostrophysica).
"User's Guide: Microsoft Access", Microsoft Corporation, 1994, pp. 378,594,599, 630-632 (13).
"McAfee's New 'Self-Service' Help Desk Web Suite Makes PCs Help Desk-Ready", Newswire Association Inc., Oct. 13, 1997.

Niemeyer, R., "Using Web Technologies in Two MLS Environments: A Security Analysis." *IEEE*, pa 205214, 1997.

Porter, T., "MCI offers tracking system", *Service News*, Apr. 1994, p. 17.

Rosen, Michele, "BPCS steps into new millennium", Midrange Systems; Spring House; May 10, 1996. This article informs about the new release of BPCS Client/Server Software as the most extensive upgrade of the product since 1980s. It incorporates onject tech.

Shklar, L., et al., "MetaMagic: Generating Virtual Web Sites Through Data Modeling," http://www.scope.gmd.de/info/www6/posters/714/poster714.html.

Tanenbaum, A., *Computer Networks*, pp. 410-412.

Vizard, M., "MCI to Pilot Convergence Billing Service", *InfoWorld*, v. 18, Issue 37, Sep. 1996.

Yager, T., "Mixed Messages", *UNIX Review*, v. 16, n. 2, p. 29, Feb. 1998.

XIIR6.3 (Broadway) Overview, http://www.x.org/broadway.htm.

"Carriers Improve Net Management Services", *Communications Week*, p. 74.

"Network management; new software platform enhances . . . ", Product Announcement, *Edge*, on & about AT&T, v. 10, n. 375, p. 11(1).

"New software platform enhances network management capabilities . . . ", *Business Wire*, p. 9281122.

Clow, G., "Stac Unveils Windows NT 4.0 and Web Browser Support in New ReachOut 7", Feb. 12, 1997 http://www.stac.com/news/pressrel/pr_ro_unveil.html.

Jainschigg, J., "Billing confirmed: this easy-to-use box turns guest calls into revenue." *Teleconnect*, vol. 12, No. 9, p. 39(4).

Quadri et al., Hewlett-Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value-added Services" http://www.cisco.com/warp/public/146/presscom/1998/apr98/28.html.

HP Smart Internet, "Transform User Data Into Revenue" [16].

HP Smart Internet Usage Analysis Solution, "Transform User Data Into Competitive Advantage".

HP/Cisco, Internet Usage Platform, "Transforming Internet Services Into Revenue" © Hewlett-Packard Co. 1998[16].

"Release Note for Netflow FlowCollector Release 2.0," © Jul. 1998 and "Release Notes for Netflow FlowAnalyzer Release 1.0" © Aug. 1997[16].

HP Invent, "Capturing the Usage Billing Advantage" http://www.hp.com/communications/usage/infolibrary/whitepapers/dsforum_print.html[16].

He, Taniguchi, "Internet Traffic Control and Management Architecture", IEEE, Oct. 22-24, 1998, pp. s46-03-1-s46-03-5.

Sixth International Conference on Network Protocols, IEEE, Technical Communication Services, Oct. 13-16, 1998, Table of Contents[4].

Markovich, Robert, "WAN Service Level Management Could Keep Your Feet Out of the Fire, Ensure Carriers Dilligence", Network World, Jul. 7, 1997.

Inoue et al., "Secure Mobile IP Using Security Primitives", IEEE 1997.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro-Tel's Microcall for Windows 95/NT", Teleconnect, vol. 15, No. 12, p. 35, Dec. 1997.

Kenney, Kathleen, "American Management Systems Launces Internet-Based Customer Care and Billing Tool for Telecom Firms", PR Newswire, New York, Oct. 9, 1996, extracted from http://proquest,umi.com on internet Feb. 28, 2002.

Morgan, Rick, "When Used Right, Internet can be Effective Marketing Tool", Madison Capital Times, Madison, WI, Nov. 8, 1996. extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on internet on Feb. 28, 2002.

"Cryptography and the Internet", www.echonyc.com/~ysue/crypt.html, 1995.

Lee et al., "Supporting Multi-User, Multi-Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

"Help-Desk Market Seeks Suite Success", Computer Reseller News, Jan. 5, 1998, p. 49.

Microsoft Press Computer Dictionary, Third Edition, 1997.

\* cited by examiner

CUSTOMER INTERFACE SYSTEM FOR MANAGING COMMUNICATIONS SERVICES INCLUDING TOLL FREE SERVICES

This application is a Continuation of commonly assigned, co-pending U.S. patent application Ser. No. 09/160,725 entitled "INTEGREATED CUSTOMER INTERFACE SYSTEM FOR COMMUNICATIONS NETWORK MANAGEMENT", filed Sep. 25, 1998, now U.S. Pat. No. 6,763,376, the disclosure of which is hereby incorporated herein by reference.

FIELD OF THE INVENTION

The invention relates to data management and communications, and particularly to providing access to secure data and communication management tools for an enterprise to a plurality of customers over the Internet which is an insecure communications network. The enterprise described is a telecommunications network, and the tools include management and reporting tools to enable the customers of the telecommunication network to manage and obtain reports and data pertaining to their business on the network.

BACKGROUND OF THE INVENTION

Introduction

Computer user interfaces have undergone dramatic changes over the past forty years, evolving from the simple, line-oriented, prompt-response systems of teletypes, to the forms-based interfaces of dumb terminals, to today's graphics-based, windowing interfaces like Windows 95. The genesis of the modern GUI paradigm in fact dates back some thirty years to work done at the Xerox Palo Alto Research Center which pioneered the usage of the WIMP (Windows, Icons, Menus, and Pointing Devices) interface. The introduction of Apple's Macintosh computer in 1984 brought the WIMP interface to a growing population of personal computer users. The WIMP's evolution from research project to universal standard culminated in 1990 with Microsoft's release of the 3.0 version of Windows. In the many years since its introduction at Xerox PARC, the WIMP interface has been enhanced and refined by decades of human factors engineering, and today's computer users enjoy the benefits of an interface paradigm that has been highly optimized in terms of efficiency, ease-of-use, and intuitive operation.

In 1992, CERN's Tim Berners-Lee conceived of combining a hypertext browser that interpreted a page description language retrieved from document servers accessible by name over a simple network protocol, and so created the framework for the Worldwide Web. Shortly afterward, Mark Andreeson (who would later found Netscape) created a GUI-based HTTP browser called Mosaic that set the current standard for browser interface design. Prior to Berners-Lee's innovation, data resident on the Internet was accessible only via arcane utilities such as FTP, Gopher, and WAIS, making it inaccessible to most people. Hypertext proved to be the perfect medium for navigating, the disparate disclosures of the Internet, and for the first time made Internet-based data accessible to casual computer users.

While this particular application of hypertext was new, hypertext itself had been around for quite some time. The Mosaic interface was in fact quite similar to interfaces commonly used by on-line help systems and computer-based training (CBT) software. The explosion of websites and Internet users however brought hypertext-based information access to a massively greater audience than ever before, and the web browsing paradigm has proven so usable by novice computer users that many aspects of today's browser-based interfaces are being incorporated into the design of transaction processing and decision support systems.

User Interfaces and the Web

Browsers have been developed using the standard interface elements of current GUI environments, but have specialized the ways in which those elements are combined to navigate and view hypertext documents. Browsers provide an environment that tightly and seamlessly integrates multiple unrelated applications and have eliminated many key aspects of the standard GUI desktop metaphor.

The current MCI ServiceView (MSV) product line provides MCI Business Market customers with Windows based client-server applications for customer network management and call usage analysis. These applications include: Perspective, TrafficView, 800 Network Manager, Outbound Network Manager, Fault Manager, Direct Dispatch, Call Window, and System Administration and were built and deployed between 1994 and 1997.

Although the MCI ServiceView PC applications reside on a common platform and use objects to promote common look and feel, there is little cross application interoperability and data sharing. The customer must use the separate applications to gain access to their data. There are additional customer network management applications (e.g.—HyperScope, Call Manager, Portfolio) which are not MSV based and therefore do not share the same PC configuration and communications as the MSV ones.

SUMMARY OF THE INVENTION

The Next Generation product suite, also referred to herein as Starbucks, a consolidated Web based network management product to the customer. There are many reasons for providing a web-based solution for these requirements:

User access—depending on needs, web applications may be made available to anyone with Internet access either internally behind a firewall, or externally to anyone on planet Earth.

Training & support—a critical part of most application deployment is the plan for training and support. Web-based applications can eliminate much or all of this need since they utilize existing client software which users have already installed and learned how to use.

Platform independence—a well-designed web application should work with most web browsers on whatever hardware and OS platform the user selects. Additional requirements analysis are not needed to specify the supported user environments. The choice is where it belongs: with the user!

Productivity—the development cycle for web applications is shorter than for traditional client-server applications due to improved development environments and the plethora of easy-to-use, high-powered tools.

Availability of tools—there are a large and rapidly increasing number of tools available at low or sometimes no cost for implementing sophisticated web applications.

Communications problems—the Achilles heel of many applications has traditionally been their connectivity to the user community. Web-based applications shift the burden of connectivity to the user and the Internet provider using standard hardware and software. These issues are resolved before the web application ever hits the street.

Installation and configuration—the other main problem area for traditional applications has been the initial setup and installation. Again, the web applications avoid this problem by utilizing existing software and facilities.

Minimal client development—since the client side of web applications uses off-the-shelf browsers, development is limited to specifying screen layouts and data presentation using a common interface. In many cases, users can design the screens using standard word-processing and web screen design tools.

The main point is that web-based applications allow developers to focus their development on the specific products and services, without wasting development, test, and support energy on other aspects of software delivery.

Internet Gateway Security Standards

All external MCI Web sites must obey the Internet Gateway Security Standards enforced by MCI Network Computing Services (NCS, the owners of Infolink which is the network that all our computer systems use). Placing a web site on the Internet and then allowing our customers to use it to access sensitive MCI account information is a very serious proposition. To do this a certain server architecture must be obeyed to ensure systems security.

Below is a summary of the basic architecture that all MSV and other web sites that communicate with customers must obey. In a nutshell, no customer may directly connect from their PC to a web site or web page link running on a midrange, DBMS or warehouse server connected to the MCI Intranet. Every web site link including presentation pages will run on web servers in the demilitarized zone (DMZ), and at the same time these web servers will have no connectivity to any midrange or host server on the MCI Intranet, except for special proxies and/or relays that use sophisticated and somewhat cumbersome security measures to make specific secure connections to application hosts on the intranet. This architecture model separates all server processing, data storage and legacy connectivity from any web system that directly interacts with a customer in order to insure MCI systems integrity and security.

ARCHITECTURE

Figure 1:
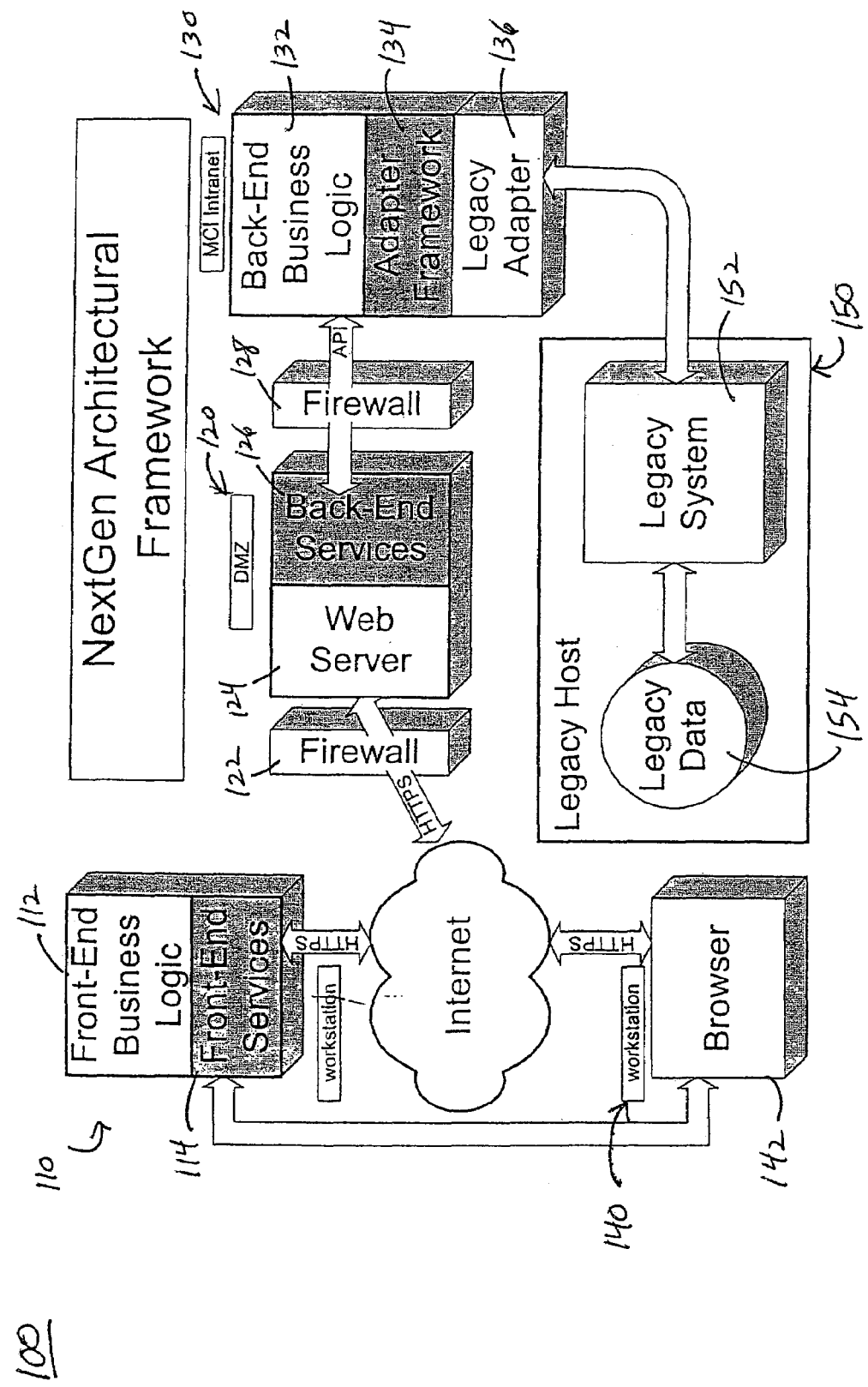
FIG. 1 is a simplified distributed view of the platform components of the present invention, with generic service components shaded.

The Starbucks architecture provides the infrastructure by defining and building common components in the following areas:

Software architecture—details the system components (client and server based) of Starbucks Network architecture—defines the physical network which needs to be built to satisfy the security and data volume requirements of Starbucks Data architecture—focuses on the back-end systems or the data sources for Starbucks Infrastructure—covers security, order entry, fulfillment, billing, self-monitoring, metrics and support Referring to FIG. 1, system 100 includes front end 110, DMZ 120, back-end 130, workstation 140 and legacy host 150. The front end 110 includes front-end business logic 112 and front-end services 114 that are coupled to workstation 140, via the Internet. Workstation 140 may represent a customer computer system executing a conventional web browser 142. The front end 110 may represent the customer's initial interaction with system 100.

DMZ 120 includes firewall 122, web server 124, back-end services 126 and firewall 128. Firewalls 122 and 128 provide security for DMZ 120. Web server 124 and back-end services 126 receives customers' requests and processes these requests by forwarding them to the appropriate systems in back-end 130.

Back-end 130 includes back-end business logic 132, adapter framework 134 and legacy adapter 136. Back-end 130 may provide new applications and services for use by customers. Back-end 130 may also provide connections to existing applications and services via legacy adapter 136. These legacy or existing applications may be executed by legacy host 150. Legacy host 150 may include legacy system 152 and legacy data 154 that function to provide services to customers.

Software Architecture

Overview

Multi-Tier Architecture

Complex, distributed client-server systems are typically deployed using a tiered (also called "layered") architecture. The software re-architecture is typically focused on the presentation, application, and data base layers of this model and it is thus often referred to from a software standpoint as a "three-tier" architecture.

Component Architecture

To facilitate the rapid development of the Next Generation platform and standardize key architectural aspects of their design, implementation and user interface, The NextGen Vertical Team has defined a comprehensive set of core service components with broad application across the required applications. Examples of services provided by such a framework include Session Services—Authenticating users and their entitlements Communication Services—Simplifying interchange of data across the network Data Presentation Services—Displaying tables and charts; sorting and summarizing Backplane Services—Combining multiple programs into a unified application suite Strategy—Client-Tier Rearchitecture The software strategy will focus at the client/presentation level, producing a new, browser-based, consistent user interface. Server-side (application-tier) interfaces will be maintained wherever possible.

In this scenario, objects are designed and implemented in the user interface parts of the system, allowing for reuse of a common GUI abstraction and problem-domain abstractions (e.g., billed phone call records). Application-specific classes would be derived which would support the functionality and server interfaces for each application.

Some of the functionality delivered through the system will be cross-product (e.g., Reporting); other functionality will be product-specific (e.g., 800NM, Call Manager, HyperScope).

The system needs to be able to be delivered to customers with the functionality appropriate to their product mix.

The client tier software will be organized into a component architecture, with each component providing one of the areas of functionality described above. These components will be called "applications" in the following discussion, although they may not technically be independent executables.

The Next Generation applications are:
Inbox
Next Generation Report Viewer
Next Generation Report Requester
800 Network Manager
Fault Manager
HyperScope
Real-Time-Monitor
System Administration The client-tier software will be created using the Java programming language and distributed as a set of Java applets and classes. The use of Java technology provides an industrial-strength object-oriented development environment over the internet; a browser-based interface; platform independence; automated software distribution; and significant benefits in the development life cycle.

This option achieves the following goals of the Next Generation product:
Browser-based, thin-client interface
Unified, consistent user interface
MCI's network management product suite can be delivered over the World-Wide Web
Platform independence
New platform The impact on existing MCI systems varies. Applications which are already architected in a client/server model (e.g., Traffic View) will require relatively little re-engineering on the server side, since they will continue to use their existing interfaces and protocols. Applications which depend on extensive client-side processing (e.g., Perspective) will require a new server backend.

This approach provides only rudimentary reuse of problem-domain abstractions across applications, and therefore it does not unify the content (as opposed to the look-and-feel) of the applications. A generalized reporting viewer (see below) can make a Traffic View report look a lot like a Perspective report, but without more extensive server-side re-engineering, priced and unpriced calls cannot appear in one report; nor can a particular unpriced CDR be reliably tied to its priced counterpart.

The approach provides some benefits in the time-to-market for future products. The "Write Once, Run Anywhere" cross-platform support of Java technology allows a single version to run on all platforms, OS versions, and browsers. Consolidating the architecture of all the applications and building on a common services layer (see below) will result in more reliable software in a shorter time frame. Developers will be able to move between applications with more ease. Java technology provides several other development and time-to-market advantages over C or C++, the traditional development languages for the MSV platform. See "Use of Java Technology," below.

Inbox/Email Paradigm

A major part of the functionality is centered around reporting. The interface paradigm will be asynchronous; that is, the customer will request a report, and can continue using the system (or other applications on the workstation) while the report is processed at the server. When the report is completed, a notification will appear in an "inbox." At any point thereafter, at the customer's convenience, the report can be downloaded and viewed, saved, etc. This paradigm preserves the responsiveness of the platform and emphasizes the customer's control of the system.

The inbox will be used as a general conduit for messages to the customer; news of available upgrades, problems with the servers, problems with report requests, promotional announcements, product offerings, etc. Messages will remain in the user's inbox until they are deleted by the user, or expired after a certain (relatively long) period.

The paradigm is very much like email, and the implementation will share many email-like characteristics. The architecture for reporting and message delivery is essentially "store-and-forward"; this is the essence of email systems as well. The actions which a customer will perform with respect to the contents of the inbox are the same ones which would be available in an email situation (read this message, delete this message, get the attachment for this message (e.g., a report)).

It is tempting to use an actual mail server as the back-end repository for the stored messages and reports. However, the Next Generation platform will require somewhat more functionality than a standard mail server would provide (e.g., multithreaded server/client for high priority messages, guaranteed delivery, recoverable downloads). Still, the system will use standard mail messaging protocols to interact with the inbox.

The similarity to an email system provides an opportunity to leverage parts of an existing mail server implementation. It is anticipated that royalty-free source code license will be obtained for a mail server which implements the desired protocols, and that the source code will be adapted and enhanced to fit the requirements of the Next Generation platform.

Tier/Interface Structure

The tier/interface structure will involve a re-write of the user interface and communications layer for the component applications. The discussion below focuses on a high-level description of the decomposition of the system into client, web-server, dispatch, and middle-tier services, and the message interfaces between them.

The message protocols from the client to the server fall into a few distinct categories:
User authentication/entitlement/profile messages, which interact with the System Admin server
Inbox control messages
Inbox fetch messages (e.g., report downloads)
Report requests
Transaction requests (e.g., to 800NM)

The messages from the server to the client also fall into a few distinct categories:
Synchronous responses to client messages:
Acknowledgement of report requests
Commits/refusals of transactions
Synchronous information retrieval (e.g., authentication)
Inbox messages
Data downloads All communications in both directions will be channeled through the DMZ Web servers. All communications between the DMZ Web servers and the client workstation will be encrypted using SSL. Requests from the client to the servers will be "wrapped" by the common communications service (see below) with session, authentication, and application-id information (prior to encryption).

For incoming (client-to-server) communications, the DMZ Web servers will decrypt the request, authenticate and verify the session information. The communication will then be forwarded through the firewall over an encrypted socket connection to a pair of decode/dispatch servers located within the MCI Intranet. These servers will decrypt the request, authenticate the user's access to the desire middle-tier service. Communications with each middle-tier service will be handled by proxy processes, which will manage the messages and communications with the actual middle-tier server.

Outgoing (server-to-client) communications will follow the reverse route. The proxies will feed responses to the decode/dispatch server, which will encrypt the client-bound messages and ship them to the DMZ Web servers over the socket connection. The Web servers will forward the information to the client using SSL.

Client-Tier Software Architecture

The client tier of the Next Generation Network Manager will be primarily responsible for presentation services.

The client tier software will be organized into a component architecture, with each component providing one of the areas of functionality described above. These components will be called "applications" in the following discussion, although they may not technically be independent executables.

The applications will be integrated using a "backplane" which provides a set of services to the applications and manages their launch. This is similar to the MSV platform in relation to the MSV applications.

Use of Java Technology

Java is described as a simple, object-oriented, distributed, interpreted, robust, secure, architecture neutral, portable, high-performance, multithreaded, and dynamic language according to the Java Language white paper.

The language was originally created because C++ proved inadequate for certain tasks. Since the designers were not burdened with compatibility with existing languages, they were able to learn from the experience and mistakes of previous object-oriented languages.

Even more importantly, Java was designed from the ground up to allow for secure execution of code across a network, even when the source of that code was untrusted and possibly malicious. This required the elimination of more features of C and C++.

Furthermore, Java was designed to be cross-platform in source and compiled form. Java applications are "Write Once, Run Anywhere": there is no need for separate versions for different operating systems, or different versions of a give operations system. Java applets download classes dynamically from the internet host, and thus are self-updating and self-distributing.

Customer Access Mechanism

Figure 2:
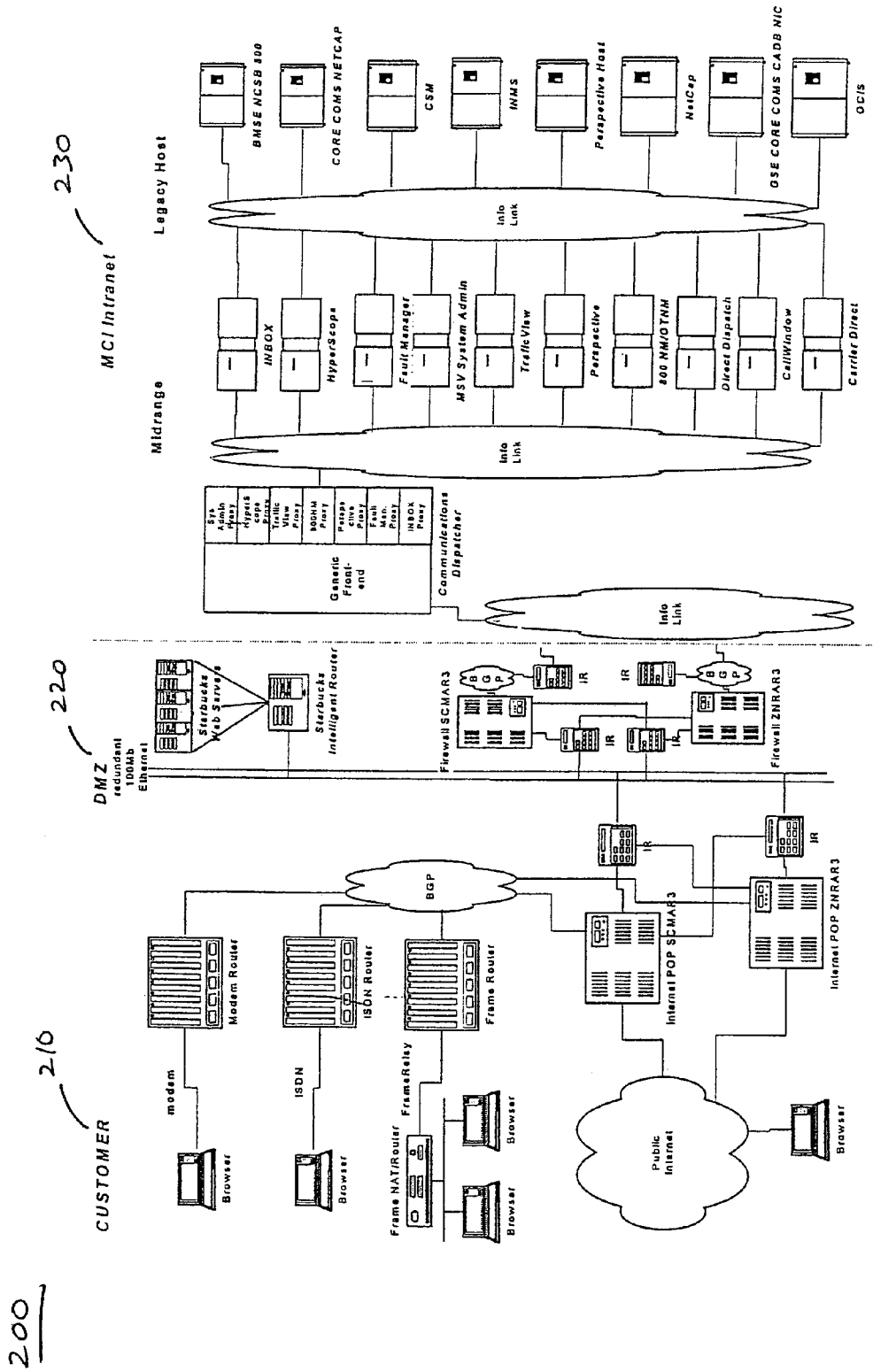
FIG. 2 is a diagrammatic view of the physical, end-to-end architecture of the present invention, beginning with the customer web browser to the enterprise midrange servers and existing mainframe systems.

The customer will use one of the supported access mechanisms to connect to the MCI premises web servers which are located in the DMZ. Referring to FIG. 2, all direct Starbucks customer interaction is between the customers web browsers and the MSV web servers. For example, system 200 in FIG. 2 is a diagrammatic view of the physical end-to-end architecture consistent with the present invention. As illustrated in FIG. 2, system 200 includes customer 210, DMZ 220 and MCI Intranet 230. Customer 210 may represent one or more customers that wish to access particular applications. DMZ 220, as described previously, may represent the web servers and firewalls used to authenticate the customers and process customers' requests. MCI Intranet 230 may represent the communications dispatcher and mid-range servers that route requests to the particular servers managing the applications. The mid-range servers may also connect to legacy systems. The two basic access mechanisms for customers are public Internet access and direct MSV web server access (intranet access).

Intranet Access

Three types of direct MSV web server access will be offered by Starbucks and a monthly, flat nominal billing fee will be assessed for each access account.

Direct modem and/or ISDN access may be requested when the customer or Order Entry (OE) hub registers a new Starbucks user. The customer may use the ISDN and modem account interchangeably, since the remote access servers which authenticate the connection will share the same user authorization database. When the Starbucks direct modem or ISDN dialup connection is connected to the Starbucks web servers the customer may not simultaneously browse the public Internet through this same connection. If the customer has an operating system that supports multiple physical interfaces such as Windows 95, then the customer may configure static routes so that the user may still browse their own private intranet or the public Internet while directly connected to the MSV web servers. If the customer wants a dialup account that can also browse the Internet, then they should use iMCI instead of direct MSV web server access.

The third type of direct access supported by Starbucks is direct Frame Relay access which will connect a customer's Ethernet or similar LAN to the MSV web servers using a 1.54 Mbit/second Frame Relay Permanent Virtual Circuit (PVC) and an MCI specified Network Address Translator (NAT)/Router. Since Frame Relay supports multiple PVSs the customer may also use their Frame Relay NAT/Router to simultaneously connect to the public Internet over a separate PVC as negotiated with their ISP which is preferably MCI.

In one implementation, the customer account representative will order the Frame Relay service by selecting the "Hyperstream Frame Relay" MCI product from the MCI Product Library. After securing HyperStream service the account rep. will then contact MSV $1^{st}$ level support for PVC assignment and NAT translation specification, etc. MSV $4^{th}$ level support will actually configure and issue address assignments, etc. for $1^{st}$ level support to give to customers. A nominal, flat, monthly billing fee will be charged to Starbucks Frame Relay customers. This charge will be separate and possibly different from the dialup modem and ISDN charge.

Access from internetMCI via dial-up modem banks (e.g., 5 meganodes) may also be used. In this case, separate userid/password/challenge password for physical access vs. Starbucks userid/password may be used.

Web servers will track userid/password/apps being authorized/date-time, which will expire after some inactivity timeout.

Public Internet Access

Public internet access may also be provided. The customer will need to make arrangements for public Internet access from an Independent Service Provider (ISP), and the type and speed of public Internet access are virtually unlimited. Note that internetMCI (iMCI) is the preferred ISP but not required for Internet access.

Demilitarized Zone (DMZ) Web Servers

The DMZ 220 is a special secure network area set aside on MCI premises exclusively for potentially hostile customer access. All MCI internal systems are located on the MCI Intranet 230 which is the MCI internal network. All DMZ equipment is physically isolated and firewalled from the MCI Intranet. Likewise the DMZ equipment is firewalled and thus obscured from hostile attacks from the public Internet, except for limited web browser access to the MSV web servers which are located in the DMZ. The customers web browser connects to an MSV web server in the DMZ which in turn acts as a proxy to extract select information from midrange MSV servers locate in the MCI Intranet. Thus a customer never directly connects to servers in the MCI Intranet in order to ensure internal systems security and integrity.

The DMZ double firewalls the public Internet from the MCI Intranet. Web servers located in the DMZ never store or compute actual customer sensitive data. The web servers only put the data into a form suitable for display by the customers web browser. The web servers in the DMZ are securely implemented in all manners, but there is always the chance of a MCI computer operator lapse or inside security breach. In the event of an inadvertent DMZ to public Internet security breach, only the web servers in the DMZ could be attacked and not an internal MCI system on the MCI Intranet. Since the DMZ web servers do not store computer data, there is a much smaller chance of any customer information being jeopardized, and the greatest risk of a DMZ intrusion is mostly just system downtime and other inconveniences.

DMZ Network Connection

All MSV web servers located in the DMZ will be interconnected by a 100 Mbit/second Fast Ethernet. Direct Starbucks customer access to MSV web servers will involve the customer directly connecting to an MSV Modem, ISDN or Frame Relay remote access server. The remote access servers will be connected to the existing MCI BGP network, which has redundant connectivity to the SCMAR3 and ZNRAR3 backbone routers, which in turn have redundant connectivity through the IR routers to the MSV web servers 100 megabit LAN. All NGNM direct connectivity will be immediately firewalled such that can only access the MSV web servers in the DMZ.

Public Internet access will come through the SCMAR3 and ZNRAR3 MCI premises Internet Points of Presence (POPs) which have redundant 45 Mbit/second Internet connectivity and are currently only about 4% utilized. This access will share the redundant access that the Starbucks direct access customers use to get to 100 Mbit/second MSV web server Fast Intranet LAN. The Internet POP routers will be configured to allow new Internet traffic to the Starbucks MSV web server, besides the other public Internet traffic that already terminates on other web servers in the DMZ such as "MCI.COM".

Once the public Internet or direct access traffic has terminated at a DMZ web server, the MSV web server will treat the two types of traffic equally. Both types of traffic will require logon to an initial MSV web server home page, and all communications will be conducted using Secure Sockets Layers (SSL) and/or other types of similar security. All traffic from a web server to a customer PC will be treated as highly sensitive, secure data, regardless of the content. When the web server proxies an MCI Intranet server the traffic will ride the same redundant physical network up to the ZNRAR3 and SCMAR 3 routers which will securely route the traffic back down through the BGP network and IR routers and into the MCI Intranet Infolink network. This routing action will constitute another virtual firewall which will only allow a very strict set of MSV web server traffic back and forth to a specific set of MSV midrange application servers located in the MCI Intranet. The traffic between the servers will also be limited in the types of connections that can be established between the servers. As a further security measure the web servers will still be required to log on to the midrange Intranet servers and vice versa. This lessens the threat of an inside job or security lapse or firewall configuration error.

Web Server Scaleability

There are 2 ways we can deal with the scaling, within a single machine (vertical) and distributed across multiple machines (horizontal). From an operational view, a single machine model is superior, however, limitations are then incurred due to the single machine architecture. These machines must be large and availability is provided through traditional HA, i.e. redundant machines. Once a machine is out of vertical headroom (CPU, disk, network I/O, etc.) architecture must scale horizontally:

Horizontally scaling a Web server has three basic requirements:

1) Either a single virtual IP address, or a pool of addresses that can be drawn from.
2) Multiple machines that run the same software (server, etc.)
3) Common content storage shared across all the servers.

For 1, a pool of addresses is usually implemented using round robin DNS. This has the advantage in that it is simple, but the main disadvantage is that it requires most users of PCs to restart their browsers when a server goes down. This is because the browsers hold on the IP address as long as they are running. Using a virtual IP address solves this problem because the address is translated to an actual valid address from the pool of servers.

A further advantage of using a virtual address and a pool of servers is that of horizontal scaling and elimination of the need for HA redundancy in the server pool. The main purpose of HA here is to provide IP failover. Applications will in any case have to be smart about reconnection if a machine goes down.

Using a pool of smaller machines (2) allows a lower entry point to Web based service as long as the machines can handle some excess capacity. The number of servers should be such that there is sufficient over capacity to handle planned down time for maintenance or possible failure.

Local Disk

For Starbucks, all content will be placed on each server. This improves local performance and isolates Web servers from each other. A number of issues are presented:

Synchronization of content across Web servers

Management of Web servers

Security

Reduced availability and reliability of disk subsystems

Synchronization

Ideally all Web servers will be updated at once with any changes to Web content. With multiple machines this is possible through a number of schemes. Unix provides rdist, CPIO, FTP and others, which can update content on local disk. A possible scenario might be:

1. Update staging machine
2. Take machine "n" off line and replace with staging machine
3. machine "n" in now staging machine
4. Repeat 1 through 4 for as many machines as are in Web rotation Another scenario might be:

1. Update staging machine
2. Using some distribution application or script (e.g. rdist) update "live" machines
3. Repeat for all machines during quite period A variation on this would be to temporarily take a machine off line while files are updated.

Management of Web Servers

As the number of Web servers grow and the amount of content increases, each Web server will have to be a mirror of every other. Maintaining multiple servers with more than basic configurations is quite troublesome, but it can be done.

Security

If a Web server is compromised the content on that server is at risk. With proper management of a machines configuration this should not be a problem.

Reliability and Availability

Using non Raid disks is less reliable than using Raid. In the event of disk failure or a machine crash, there is no recovery mechanism.

Summary for Disk

Local disk has an advantage of performance over NFS network available disk. Issues regarding distribution of content, state of users, and security can all be ameliorated by creating processes to address these individual problems. More effort is required and administration costs are greater.

With regards to reliability, moving to an HA NFS system offers better reliability. For example with an array subsystems using 0+1 RAID and hot standby disks, the disk subsystem can tolerate one or several disk failures with no loss of service. Array subsystems also generally allow for higher speed interconnects. The main disadvantage to this type of system is cost and with NFS some performance.

Intranet Midrange Servers and Legacy Mainframe Systems.

The existing MSV Web servers are currently interconnected on the ZNR Call Processing Ethernet backbone network which is part of the MCI Intranet. A separate initiative from Starbucks is adding MSV midrange server connectivity to the Intranet Infolink data network in order to support the increased TVW and P4W client/server traffic. Where possible Starbucks will exploit and recycle the existing MSV midrange server resource already on the MCI Intranet. New servers will be added to the Intranet as required by Starbucks. Most of the existing MSV midrange servers already use Infolink Token Ring connectivity to connect SNA sessions to the legacy host, mainframe systems in operation today.

The following identifies some requirements for the applications supported in implementations consistent with the present invention, also referred to herein as StarOE applications. The requirements include but are not limited to technical specifications, system interfaces, and StarOE functionality. The applications supported by StarOE include, for example, 1) 800 Network Manager, 2) StarWRS (Starbucks Reporting System), this includes Priced and Unpriced Reporting, 3) StarOE, and 4) Hyperscore. Fulfillment data will not be sent from the StarOE server for each of these applications, directly to Hibbert.

Java Implementation

The StarOE application must be constructed using a Java based, internet architecture, which will be accessed from the main Starbucks HTML home page.

Order Entry

StarOE will provide the functionality to order users (create user ids, passwords, etc.) and applications (setup security) for the Starbucks suite of applications. StarOE will store all required security data for each application.

Users

All Starbucks users will be ordered through StarOE similarly to the MSV SA, but there is no concept of a Workstation (a user will not be associated with a workstation). All user ids and passwords for Starbucks applications will be stored in the StarOE database. External users will be associated with one enterprise id, but the system should be designed for allowing an external StarOE user to be associated with multiple enterprises. All users, when added, will have a default enterprise id associated with the user id.

The following information will be collected and stored for a Starbucks user:

User Id—5 char min, 20 char max

Password—5 char min, 8 char max, must contain mix of alpha and numeric characters User name—30 char max Company Name—length is same as the existing company name User address—Fields entered for domestic are: street 1, street 2, city, state, zip. Fields entered for international are: 4 generic lines (not edited). Fields entered for both domestic and international are: phone number.

Paging system and pin—the paging system will be from a selection, and the pin will be freeform text.—for IM.

Email Id—for IM.

Fax Number—for IM.

Notification priority—for IM.

Message that will appear—for IM.

Customer's billing information, Corp ID/SVC Location

Access method—dial-up, Frame Relay, or ISDN

Charge Back information—department, location, and sales city

User Category—Carrier, Business, Account team, Customer (for billing)

Time Zone

The server will store the order date each user and each application. The StarOE server will also store the fulfillment status (fulfilled, unfulfilled, refulfilled).

User Types

A user may be an administrator for one application, and just a user for another application. Each user will need to be classified into one of the following categories. The main division among users is a User versus an Administrator (admins). Admins will have access to StarOE, whereas Users will not.

Regular User (non Admin)—A regular user type means that the user will not have access to configure users within the StarOE client for a given application, but will have access to use the application being ordered. In other words, they will have access to the use the Starbucks application that is being ordered and configured.

External Administrator—External users will have access to view and update all users under their enterprise. They will only be able to modify a user's security for the application that they are administrator for. These users will be allowed to order applications for new and existing users if they are an administrator for that application.

Account Administrator—An account administrator is for account team members. This level of user will have the ability to view user lists for multiple enterprises, and configure the users for those enterprises.

Internal Administrator—Internal users have the same privileges as External, as well as the ability to order new applications for new and existing users. Internal admins also have the ability to setup global security information for each application (may not be needed). These users will also have access multiple enterprise ids.

Super Administrator—Currently, super users will have the same access as internal users. There are no current requirements specifically for a super user. This will enable us to add functionality later. Once Starbucks starts to manage Stentor, Avantel, or concert data, then there must be various versions of the Super Users: ones for only MCI data, only Stentor data, only Avantel data, and only concert data. Within the Super User account, there should be an indicator for how long this user will have access. The choices are indefinite, 48 hours, 7 days, 30 days, and 60 days.

Read Only Administrator—Read only users will have access to the same screens as a Super Administrator, but they will not be able to make any updates. This type of user is primarily provided for the training group.

Changing Passwords

The user will be required to change the password at the first login of a new user and every 90 days. The new password must be different from the previous password only.

Applications

The Applications that are available may include 800 network manager, Hyperscope, StarOE, and StarWRS (Priced Reporting—what is now Perspective, Unpriced Reporting—what is now Traffic View).

StarOE will provide an option to order a hard copy of the documentation for an application during the order process.

800 NMGR Security

StarOE will provide the same functionality as the current MSV System Administration. A user's 800 nm security profile will contain multiple (Tollfree) Corp Ids, with each Corp Id having an associated RACF Id. The RACF ids will be manually entered for each corp id. A default corp id must be chosen for each user.

Communication from the 800 nm server and/or the 800 nm client to the StarOE server will be via TCP/IP, using the messages defined in the StarOE server interface document (in progress). We may need to send a message to the 800 nm server when a user logs in to Starbucks, and the user has access to the 800 nm application.

Communication between the StarOE server and NETCAP will be via registry, using messages defined by NETCAP.

There will be no invoice recipient or setting of the 800 PCCM flags in CORE.

The following functionality may also be provided:

Functional level security.

Automated access ids similar to OTNM.

Storing of internal NETCAP user ids.

StarWRS

The StarWRS (Starbucks Web Reporting System) application is the reporting mechanism for the Starbucks platform. The application setup is divided into three categories based on products, 1) VNET, 2) VISION, and 3) Toll Free.

Vnet/CVNS

The Local Level Billing (LLB) Hierarchy can be composed of a nine level deep tree structure where each node on the tree represents a entity within a Company (e.g. Enterprise Id, corp id, Organization, or Service Location).

Downloading the hierarchy may be done a single level at a time. This will be done by downloading only a parent node with its immediate child nodes. Since the hierarchy is infinitely wide, we may need a way to download only pieces of each level.

StarOE will display the VNET LLB hierarchy for security setup when VNET reporting is ordered. The user will be associated with a node from the hierarchy. The report options that will be available at any node are:

Priced Reporting
Priced Call Detail
Invoices/MIRs
Non Metered
CVNS
Vision

StarOE will display the VISION hierarchy for security setup when VISION reporting is ordered. The hierarchy contains corp ids for a enterprise, and service locations for each corp id. The user will be associated with either a corp id node or a service location node. The report options that will be available for this product at the corp or service location level are:

Priced Reporting
Priced Call Detail
Invoices/MIRs
Non Metered
TollFree

StarOE will display the Tollfree hierarchy for security setup when Tollfree reporting is ordered. The hierarchy contains a list of corp ids, with each corp id having a list of tollfree numbers under it. Reporting options at the Corp id level are:

Priced Reports
Priced Call Detail
Invoices/MIRs
Non Metered

Reporting options at the tollfree level are:

RTM
Unpriced Reports
Alarming
Unpriced Call Detail
Integrated Messaging

StarOE will store information in support of Integrated Messaging (IM). The follow fields will be optional for IM customers only, and entered during the order user process.

Paging system and pin—the paging system will be from a selection, and the pin will be freeform text
Email Id
Notification priority (1, 2, or 3)
Content of message that will be sent on Notification
Refresh User List The StarOE client will provide a refresh option, which will call the StarOE server to update the current list displayed.

Provide a Demo Version

StarOE will need to develop software which will allow the StarOE application to run in "Demo" mode, which does not communicate with the back end servers. The StarOE group assumes that the common communication module will decide if the starbucks application as a whole is in "Demo" mode, therefore, messages will be sent to a StarOE provided demo stub rather than passing across them through the network.

Any StarOE requests sent by the client browser will be received by a StarOE stub program, that is called by the common objects communication module. The demo stub will determine which StarOE message has been received, and call the appropriate routine to return the answer set. All update requests will return a successful response, but the requested update will not be stored and screens will NOT show the updates. Each request for data (i.e. get user list) will have a hard coded answer set that will be returned each time the request is sent.

The content of the data will coordinate with the other applications. For example, a user name in a StarOE will be the same user name in Priced Reporting, the user access (security) will also match. Also, a user's security (i.e. report access) will match what the other applications display.

Groups that StarOE will need to coordinate the data with are 1) 800NM, 2) Hyperscope, and 3) StarWRS (priced/unpriced). Further identification of the teams that will be involved will of course be found during the overall analysis and design of StarOE.

Fulfillment

Fulfillment consists of a Welcome letter only. The welcome letter contains the customer's name/address, user id, password, enterprise ID, application ordered, access type, and access number. Any letters sent after the first fulfillment should have text that states that the application is an add-on to their existing applications. Users will not be able to order any specific documentation to be sent through fulfillment. Hibbert will be sent a the fulfillment file on a weekly basis. The StarOE server will FTP a file in a specific format to a Hibbert designated IP address.

The fields in the interface to Hibbert should:
- Identify the locale for the user being fulfilled
- The URL for the home page for the user's at locale
- Designate if it is an initial order or additional order
- Specify customer delivery name & address (Must support both USA and International addresses)
- Specify the STARBUCKS application(s) ordered
- Specify the customer access method
- Identify the user passwords
- Specify communications information (access number)

The StarOE server will store the fulfillment status of each user/application. Additionally, their must be sufficient audit processes and reports in place to ensure that:
- all orders are sent to the fulfillment house
- all fulfillment files are received by the fulfillment house(s)
- all orders contained on the fulfillment file are processed by the fulfillment house(s)

The above information will be displayed in the StarOE client, similarly to the current MSV Sys Admin application. There should be minimal manual intervention and processing.

User Conversion

A function will be provided for converting current MSV users to the Starbucks platform. Only the user id (attempted), user name, password?, and all fields pertaining to the address will be converted. No security will be converted since the security architecture is different. When a user is being converted, they will be prompted to order an application for the user.

OE Proxy

A proxy process running on the Dispatch Server will need accept TCP/IP connections from the Dispatcher process, translate and forward the received message(s) to the StarOE Server. The analysis/design phase of the StarOE will define in detail the messages that the StarOE server will accept.

Provide a Mechanism to Switch Host Regions

The StarOE server will point to the TM and AM mainframe regions only. The server will not be able to dynamically point to other host regions. It will be possible to point to other host regions by manually changing the pointers.

The StarOE server (and client) must provide a way to switch which host region (TM, AM, TD, AD, TE, AE) the server will communicate with. The design needs to accommodate any Starbucks application that communicates with a host region. For instance, if the 800 nm application is pointing to an AD region, when that application comes to StarOE for a user's security, we need to return that user's profile which corresponds to the same AD region.

Store Common Data

The StarOE server is required to store data that may be common to all applications. For phase I, the common data will be 1) U.S. States, 2), NPAs, and 3) Country Codes. The server must provide a message for retrieving these lists.

StarOE Server Interfaces

The StarOE server will communicate with other back end systems for retrieving and sending application information. The diagrams below are an attempt to show the systems that will interface with the StarOE server. The interfaces are represented in three diagrams, based on functionality.

Figure 3:
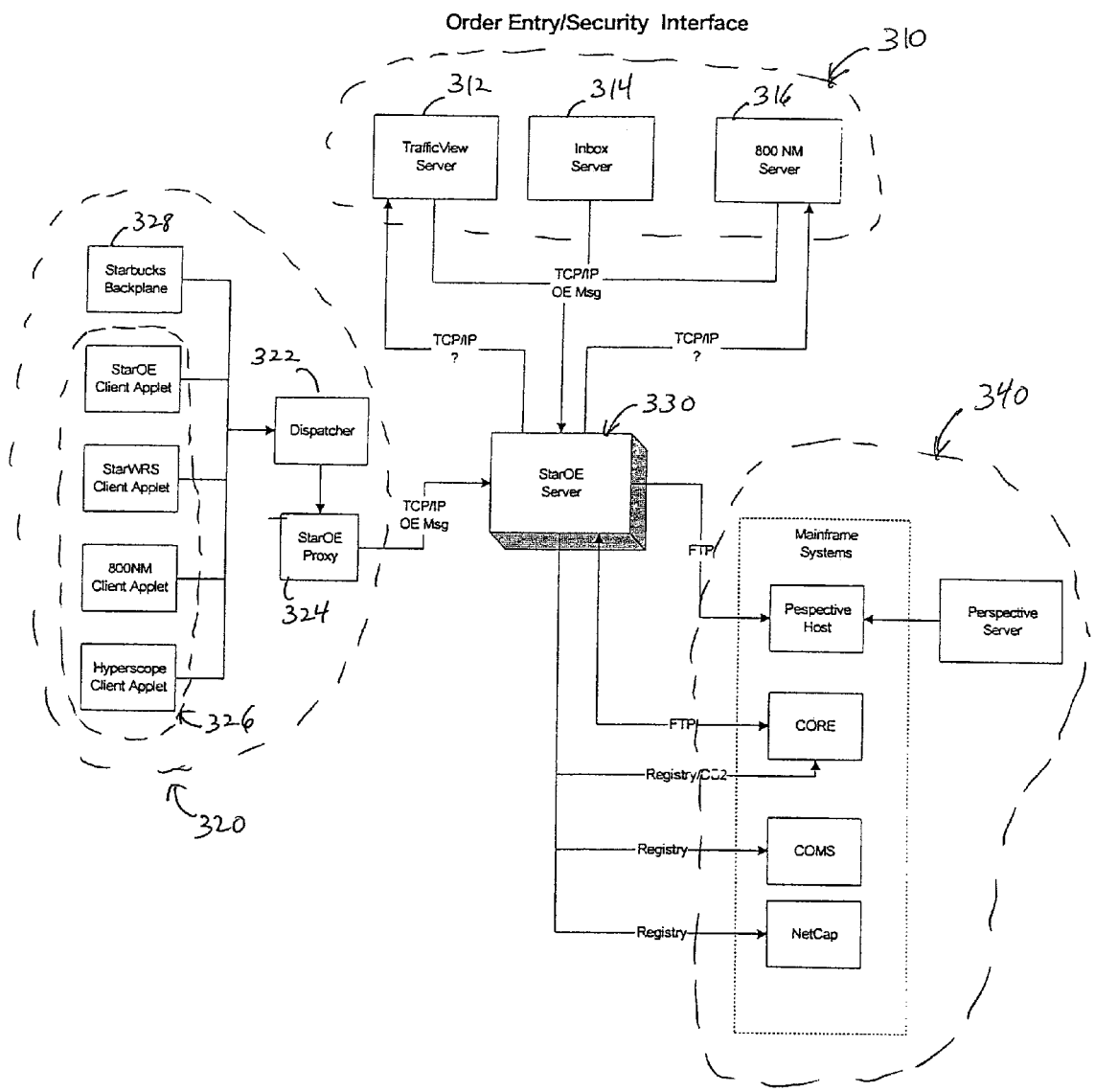
FIG. 3 is a diagrammatic view of the StarOE (Order Entry) application architecture.

FIG. 3 is an exemplary diagrammatic view of the StarOE (Order Entry) application architecture consistent with the present invention. Referring to FIG. 3, system 300 includes application servers 310, a user/front-end interface 320, StarOE server 330 and mainframe systems 340. The application servers 310 include TrafficView Server 312, Inbox server 314 and 800 Network Manager (NM) server 316. These servers execute the applications associated with the traffic view, inbox and 800 NM applications and communicate with StarOE server 330. For example, traffic view server 312 allows customers' to view communications and traffic-related information associated with their accounts. 800 NM server allows customers' to manage their 800 number accounts, as described in more detail below. StarOE server 330 communicates with client applets 326 via dispatcher 322 and StarOE proxy 324. These devices receive requests from client applets 326 and Starbucks backplane 328. StarOE server 330 relays these requests, after checking authorization level, etc., discussed above, and forwards the requests to the appropriate server in application servers 310. StarOE server 330 also communicates with various mainframe systems 340 for performing various functions. These mainframe systems 340 may include existing legacy systems for performing various applications.

For the 800 number application, a user's Toll free reporting security profile will contain at least one toll free number with at least one reporting option associated.

1. The constructor needs the user id and a modify flag passed in.
2. This class will retrieve the toll free hierarchy from the server using the GET HIERARCHY message. The client sends the enterprise id, and 'toll free' flag in the request, the server returns the list of toll free corp ids for the enterprise.
3. If modify mode, the GET TOLLFREE SECURITY message is sent to the server to retrieve the passed in user's toll free security profile.
4. As each corp is expanded, the GET TOLLFREE NUMBERS message will be sent to the server asking for all the numbers for the corp id selected. As each toll free numbers is added, search the user's profile for that number. If found, add the report options to the number text. Also, if the number has been deactivated in NETCAP, <inactive> will be added to the display. The inactive numbers will not be modifiable.
5. When the Unpriced Reports or Unpriced Call Detail check boxes are changed, the tollfree numbers selected will reflect the state of the check box.
6. When more than one toll free number is selected, the check boxes will be unchecked.
7. When the Submit button is pressed, control will be returned to the creating object, which will call the send security method on this class.
8. When the Cancel button is pressed, control will be returned to the creating object and no changes will be saved.
9. When the iSendSecurity( ) method is called, if modify mode-check for change, if change was made, format and send SET USER TOLLFREE SECURITY message. If not modify mode, format and send SET USER TOLLFREE SECURITY message without checking for change.

Field Descriptions

Corp Id/Toll Free List—This list will display all toll free corp ids and toll free numbers and under a corp id for a given enterprise. If a toll free number is part of the user's profile, the report options for that number will be displayed with the toll free number in the tree Check Boxes—These depict what report options a user will have access to for certain toll free numbers. When checked or unchecked, the corresponding toll free numbers that are selected will reflect the changes.

Select All—When pressed, all toll free numbers for a corp will be selected.

Deselect All—When pressed, any selected toll free numbers will be deselected.

Submit, Button—When pressed, any last edits performed (make sure the racf is entered for the corp id selected last), control will return to the creating object, Cancel button—When pressed, control will return to the creating object, and changes will not be saved.

For the 800 number application executed by 800NM server, a user/customer may perform a number of actions associated with managing his/her particular 800 number plan. Such actions may include, for example, selecting a routing plan number. Exemplary actions associated with the routing plan number selection are described in more detail below.

Routing Plan Number Selection
Actors:
User
Intent:
Allow a user to select or enter a Routing Plan Number.
Assumptions:
Valid Logon has occurred.
Valid Corp Id selected.
Valid Set selected if Routing Plan Number is part of a set.
Limitations:
None.
Uses/Extends:
Corp Selection.
Set Selection (if required).
Routing Plan Number—Keyed: Successful Validation
1. The system provides the user with a screen for specifying the Routing Plan Number they want to work with.
2. The user enters the Routing Plan Number they want to work with.
3. The system validates that the user has privileges for the Routing Plan Number that was entered.
4. The validation was successful and any subsequent actions the user takes with the application are applicable to the Routing Plan Number they entered.
Variation:
If the user enters a Routing Plan Number that they do not have access to, the system displays an error dialog box and prompts for valid entry.
If the Routing Plan Number entered is part of a set, the system validates that the Routing Plan Number entered part of the selected set. If not, an error dialog box displays and prompts the user for valid entry.
If the user selects a Routing Plan Number that is in a Corp other than the 1 selected, users without enterprise level security are forced to reselect another Routing Plan Number or another Corp.
Users may key 10 zeros if they have SRP access.
Routing Plan Number—Keyed: Failed Validation
This use is covered in the variation above.
Routing Plan Number—Picked: Secondary
1. The system provides the user with a screen that contains a valid list (filtered by security constraints) of Routing Plan Number(s) for the user to pick. This is based on the user's previous selection of Corp/Set.
2. The user navigates the list and selects the Routing Plan Number.
3. The Routing Plan Number is carried forward for use until the user selects or keys a different Routing Plan Number.
Routing Plan Id Selection
Actors:
User
Intent:
Allow a user to select or enter a Routing Plan Id for the selected Routing Plan Number.

Assumptions:
Valid Logon has occurred.
Valid Corp is selected.
Valid Set selected if Routing Plan Number is part of a set.
Valid Routing Plan Number selected.
Limitations:
Routing Plan Ids can only be from 1 to 99.
Uses/Extends:
Routing Plan Number Selection
User Requests Invalid Plan
User Requests a plan that he has no security for.
Routing Plan Id—Keyed
1. The system provides the user with a screen for specifying the Routing Plan Id they want to work with.
2. The user enters the Routing Plan Id they want to work with.
3. The system validates that the Routing Plan Id entered exists.
4. The validation was successful.
5. Any subsequent actions the user takes within the application are applicable to the Routing Plan Number and Routing Plan Id they entered. (Routing Plan Number was selected in Routing Plan Number Selection use case.)
Variations:
Users may key 10 zeros if they have SRP access.
The user may select a plan if it is for the set selected, or any ancestor thereof. They may NOT edit the plan if ancestral, but they can view and IMPL with it.
Routing Plan Id—Keyed—Validation Failed
1. The system provides the user with a screen for specifying the Routing Plan Id they want to work with.
2. The user navigates to the screen for specifying the Routing Plan Id.
3. The user enters the Routing Plan Id they want to work with.
4. The system validates that the Routing Plan Id exists.
5. The validation was unsuccessful.
6. The system notifies the user and does not allow the user to continue until a valid Routing Plan Id is entered or the user cancels the request.
Variations:
A routing Plan Id can be invalid if the entered id is NOT part of the selected Corp, Set (if required), and/or Routing Plan Number.
The user may press an icon or button to display a picking list.
Routing Plan Id—Picked: Secondary
1. The system provides the user with a screen that contains a valid list (filtered by security constraints) of Routing Plan Id(s) for the user to pick.
2. The user navigates the list and selects the Routing Plan Id.
3. Any subsequent actions the user takes within the application are applicable to the Routing Plan Number and Routing Plan ID they selected. (Routing Plan Number was selected in Routing Plan Number Selection.)
Routing Plan—View
Actors:
User
User Preference
Intent:
Allow the user to view a routing plan in several different forms. The two forms identified to date are a tree graphic and a spreadsheet.

Assumptions:
As part of the Routing Plan Number and Routing Plan Id Selection, a display mode will be from a preference or selectable option.
Limitations:
None.
Uses/Extends:
Routing Plan Number Selection
Routing Plan Id Selection
Tree View Primary
1. The system provides the user with a screen for specifying the Routing Plan and allows them to view it as a hierarchical tree.
2. The system displays a screen that contains a hierarchical tree representation of the selected Routing Plan and a detailed view of the selected node.
3. The tree is displayed with all of it's branches. A "shortcut" button appears by each node. The shortcut button displays "−" when the branch is expanded and "+" when not.
4. The user may click on the shortcut button to expand or collapse the node.
5. The nodes of the tree will include Origination, Day-of-Week, Time-of-Day, Percent Lterm, and Trigger Points.
6. Trigger Points are displayed as children of the node they ride on. For example, a Trigger point that rides on an Origination would be displayed under the Origination on the same level as a Day-of-Week node.
7. User can select details of any node by clicking or scrolling.
Spreadsheet View Secondary
1. The system provides user with a screen for specifying the Routing Plan and allows them to view it as a spreadsheet.
2. The user selects/enters the Routing Plan Number and Routing Plan Id they want to view.
3. The system displays a spreadsheet representation of the selected Routing Plan.
4. Trigger Points are displayed as children of the node they ride on. For example, a Trigger Point that rides on an Origination would be displayed under the origination on the same level as a Day-of-Week node.
5. The user can double click on the row to get the detail of the selected call.
6. The user can select any node by clicking or scrolling.
Time Displayed
1. The user selects their time preference in user preferences.
2. The time selected will be displayed for all time calculations except Time-of Day and Day-of-Week. These nodes are displayed in Eastern Time.
3. Choices for time selection are NetCap time (Eastern Time), local time, or GMT.
Percent & Termination Routing Plan Orders (QUIK)
Actors:
User
Intent:
To quickly add, change and/or delete one or more termination locations, and/or change the percentage allocation of two or more of these locations, for a currently implemented routing plan.
Assumptions:
The number(s) currently is working in the network and thus has one or more routing plans in inventory. Further, the plan to be changed is currently the plan in use.
Limitations:
None.

Uses/Extends:
Routing Plan Number Selection.
Routing Plan Id Selection.
Other actions that may be performed by the user associated with the 800 number service include, for example: adding/deleting one or more terminations to the currently implemented routing plan, changing the percentage allocation of the currently implemented plan (temporarily or permanently), implementing a super routing plan for a toll free number that is in working status (temporarily or permanently), implementing a universal plan for a toll free number that is in working status, changing the plan that a working number of set of working numbers is routed to, allowing the user to be notified and query order information so that the user can purge or zap an order, querying for lists of orders that satisfy filtering criteria so that any order in the resulting list can then be displayed in detailed form, viewing and updating their user preferences, and other functions.

Figure 4:
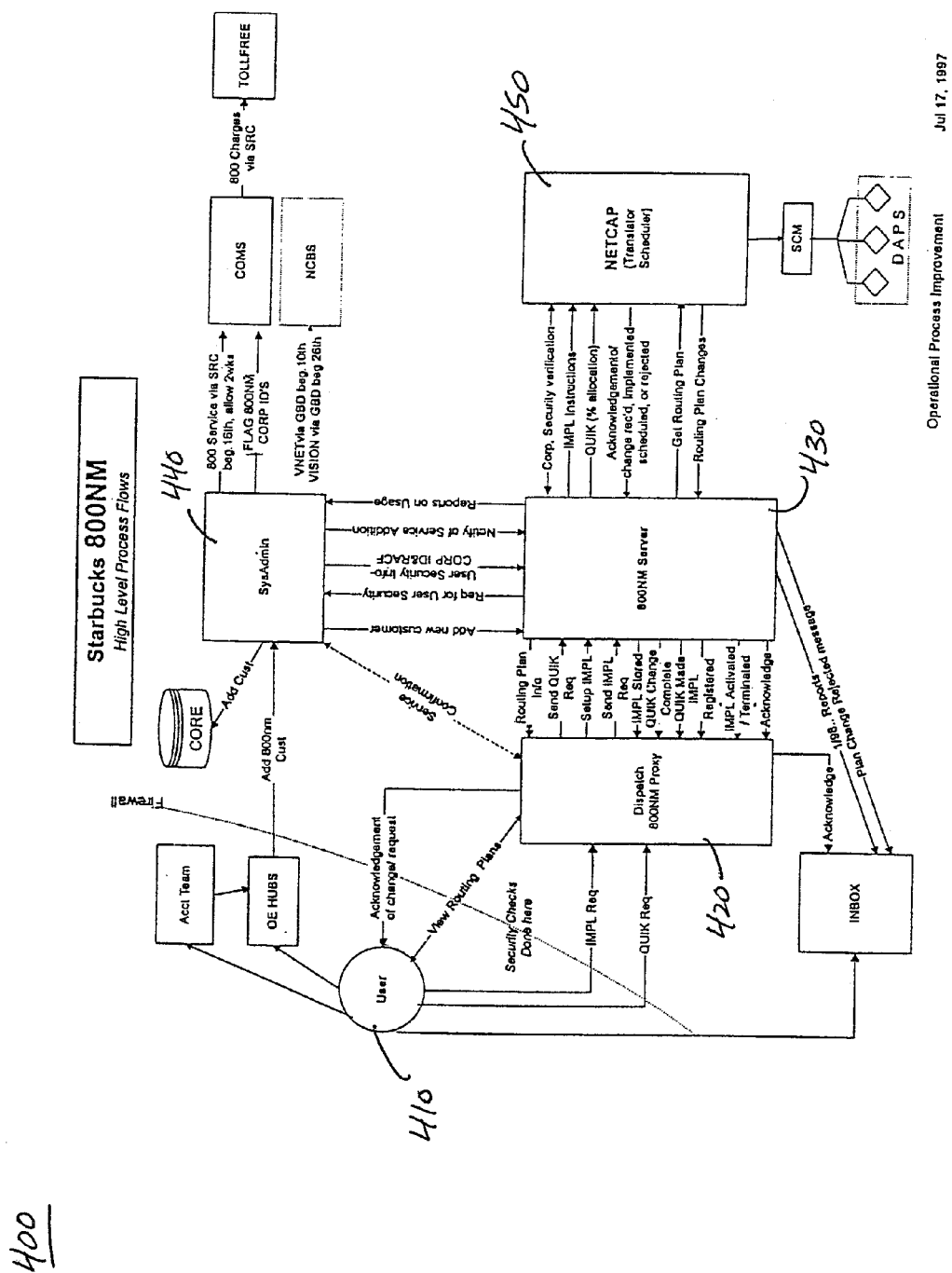
FIG. 4 is a diagrammatic illustration of the high level process flow for the 800 network manager system, as adapted for use in the present invention.

FIG. 4 is an exemplary diagrammatic illustration of the high level process flow for the 800 NM system, in an implementation consistent with the present invention. Referring to FIG. 4, system 400 includes user 410, dispatch 800 NM proxy 420, 800 NM server 430, system administrator 440 and Netcap 450. User 410 communicates with dispatch 800 NM proxy 420, for example, to view his/her routing plan. Dispatch 800 NM proxy 420 receives the request and forwards the request to 800 NM server 430. 800 NM server 430 receives the requested information and provides it to the user 410, via dispatch 800 NM proxy 420. In this manner, user 410 is able to view and perform the above described action associated with his/her 800 number service. 800 NM server 430 may also communicate with system administrator 440 and Netcap 450 to fulfill particular requests. These devices/systems illustrated in FIG. 4 may also communicate with other devices to perform various tasks associated with managing the client's 800 number service.

The scope of the invention is defined by the claims and their equivalents.

We claim:

1. An integrated customer interface system comprising:
at least one web server configured to:
manage client sessions over an internet, the client sessions including at least one of client validation or session encryption and decryption,
provide information regarding a client's 800 number service to a client,
receive commands associated with managing the client's 800 number service from the client via the internet,
provide the client with network communications and traffic information associated with network communications services provided to the client,
receive a request from the client for a report,
process the request for the report, while allowing the client to continue to interact with the at least one web server,
generate the report,
provide a notification to the client that the report is completed, and
allow the client to at least one of download, view or save the report; and
at least one dispatch server for communicating with said at least one web server and a plurality of system resources, said at least one dispatch server providing verification of system access.

2. The integrated customer interface system as claimed in claim 1 wherein each of said plurality of system resources includes a proxy server for translating applet instructions to system resource instructions and data, and translating system resource data and communications to applet data for transmission to said at least one web server and a client web browser.

3. The integrated customer interface system as claimed in claim 2 wherein said system resources reside on separate resource platforms, and said system provides interoperability to said client web browser for separate resource platforms.

4. The integrated customer interface system as claimed in claim 3 wherein said at least one web server is configured to allow the client to view network communications and traffic of said client on one resource platform and manage client network communications on another resource platform.

5. The integrated customer interface system as claimed in claim 4 wherein separate java applets embedded in a home page of said system provide simultaneous session management for each of said resource platforms.

6. The integrated customer interface system as claimed in claim 1 wherein said at least one dispatch server includes a plurality of proxy servers, with a separate proxy server for each disparate system resource platform utilized by said system.

7. The integrated customer interface system as claimed in claim 6 further comprising:
    a report requester proxy server for translating client web page requests for report information and data into requests for reports and data from a plurality of resource platforms.

8. The integrated customer interface system of claim 1, wherein the at least one web server is further configured to:
    provide the client an interface for specifying a routing plan.

9. The integrated customer interface system of claim 8, wherein the at least one web server is further configured to:
    receive a routing plan number from the client, and
    verify that the client has privileges for the received routing plan number.

10. The integrated customer interface system as claimed in claim 1 wherein each client request received from a web browser is encrypted with a public key and each client request includes a client signature encrypted with a private key associated with the client for client authentication.

11. The integrated customer interface system of claim 1, wherein the at least one web server is further configured to:
    provide the client an interface for selecting a routing plan,
    receive a selected routing plan from the client, and
    provide the client at least one of a hierarchical tree representation or a spreadsheet view of the selected routing plan.

12. A method for managing a customer's toll free service, comprising:
    providing a customer with a user interface for managing the customer's toll free service and for requesting reports associated with the customer's toll free service;
    receiving commands associated with managing the customer's toll free service from the customer via the user interface;
    implementing changes to the customer's toll free service based on the received commands;
    receiving, from the customer, a request for a report associated with the customer's toll free service via the user interface;
    generating the report in response to the request, the generating being performed while allowing the customer to interact with the user interface;
    providing a notification to the customer via the user interface that the report is completed; and
    allowing the customer to download, view or save the report.

13. The method of claim 12, wherein the receiving commands comprises receiving a routing plan number.

14. The method of claim 13, wherein the receiving commands further comprises receiving a command for at least one of adding or deleting a termination to a currently implemented routing plan.

15. The method of claim 13, wherein the receiving commands further comprises receiving a command for changing a routing plan to which a working number is routed.

16. The method of claim 12, further comprising:
    providing the customer with order information associated with the customer's toll free service.

17. The method of claim 16, further comprising:
    receiving a request from the customer to delete an order.

18. The method of claim 16, further comprising:
    receiving a query from a customer associated with the order information; and
    providing at least one order for display to the customer based on the query.

19. The method of claim 12, further comprising:
    receiving a selected routing plan from the customer; and
    providing a hierarchical tree representation of the selected routing plan to the customer.

20. The method of claim 12, further comprising:
    receiving a selected routing plan from the customer; and
    providing a spreadsheet view of the selected routing plan to the customer.

* * * * *